United States Patent [19]

Ebihara et al.

[11] 4,250,571

[45] Feb. 10, 1981

[54] PORTABLE ELECTRONIC DEVICE

[75] Inventors: Heihachiro Ebihara, Tokorozawa; Fukuo Sekiya, Tokorozawa; Takashi Yamada, Sayama, all of Japan

[73] Assignee: Citizen Watch Company Limited, Tokyo, Japan

[21] Appl. No.: 885,732

[22] Filed: Mar. 13, 1978

[30] Foreign Application Priority Data

Mar. 15, 1977 [JP] Japan ................................ 52/27593

[51] Int. Cl.[3] ...................... G04B 47/00; G04C 9/00; G06F 7/38

[52] U.S. Cl. ....................................... 368/10; 368/69; 368/187; 364/705

[58] Field of Search .................... 58/4 A, 23 R, 50 R, 58/85.5, 152 R; 364/705, 709, 569

[56] References Cited

U.S. PATENT DOCUMENTS

| | | | |
|---|---|---|---|
| 3,813,533 | 5/1974 | Cone et al. | 58/152 R X |
| 3,834,152 | 9/1974 | Nishimura et al. | 58/23 R |
| 3,943,696 | 3/1976 | Portmann et al. | 58/23 R |
| 3,953,964 | 5/1976 | Suppa et al. | 58/50 R |
| 4,033,108 | 7/1977 | Bennett et al. | 58/50 R |
| 4,043,111 | 8/1977 | Fujita | 58/23 R |
| 4,109,315 | 8/1978 | Pan | 58/50 R X |

*Primary Examiner*—Vit W. Miska

[57] ABSTRACT

A portable electronic device equipped with timekeeping circuit means for providing at least units of seconds and tens of seconds of time information, and display means for displaying said time information in digital form, which comprises first external control member for inputting numeric data signals, a control circuit for selecting at least said tens of seconds of said time data for correction, second external control member for inputting control signals to actuate said control circuit, first gate means for applying said numeric data signals to said timekeeping circuit means to effect correction of at least said tens of seconds of time information, second gate means for automatically resetting said units of seconds of time information to zero in response to correction of said tens of seconds of time information.

4 Claims, 8 Drawing Figures

PORTABLE ELECTRONIC DEVICE

BACKGROUND OF THE INVENTION

This invention relates to portable electronic devices which incorporate a timekeeping function and a display which indicates time in digital form. Such devices include, for example, digital type wristwatches and electronic calculators which incorporate a selectable timekeeping function.

When setting the timekeeping section of such a device, for example in accordance with a standard time signal, a disadvantage of conventional devices is that setting can only be performed in units of one minute. Thus, for example, if the standard time signal (transmitted by radio or telephone, say) indicates a time of 2 (hours). 45 (minutes). 10 (seconds) when the user wishes to correct the time, it will be necessary for the user to wait until a signal of 2.46.00 is transmitted as the standard time signal, i.e. the user must wait for a period of 50 seconds in this case before setting the time in accordance with the standard time signal.

SUMMARY OF THE INVENTION

It is therefore the object of the present invention to provide a portable electronic device incorporating a timekeeping function in which the time can be set in units of tens of seconds, or units of one second, to enable rapid setting to the precise standard time.

BRIEF DESCRIPTION OF THE DRAWINGS

A further understanding of this and further objects and advantages of the invention will be apparent from the following description of the drawings, whose scope shall be provided by the appended claims.

In the accompanying drawings.

DESCRIPTION OF THE PREFERRED EMBODIMENTS

A description of the preferred embodiment of the present invention will now be given, referring to the accompanying drawings.

Figure 1:
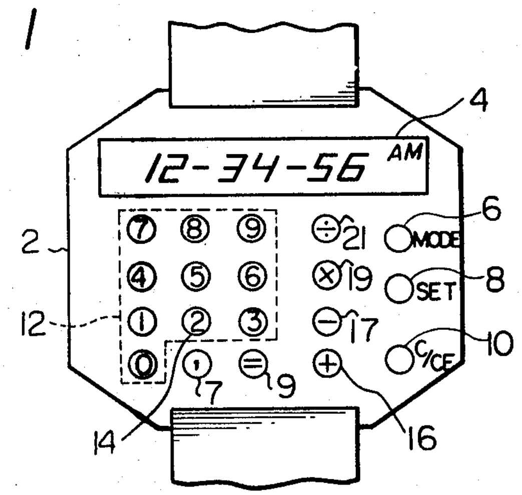
FIG. 1 is a diagram showing the display, switches and pushbuttons of a combined wristwatch and calculator constructed in accordance with the present invention.

FIG. 1 is an external view of the device of the preferred embodiment. In FIG. 1, numeral 4 indicates a digital display which can be used to display input data and calculation results when the device is used as a calculator, and can be used to display time information when the device is used as a timepiece. In FIG. 1, the device is shown functioning as a timepiece. Numeral 6 indicates a mode switch, used to switch the operation of the device from the timekeeping to the calculation mode, and vice versa. Hereinafter, the term "timekeeping mode" is used to designate the operating state of the device in which time information appears on the display. The timekeeping function however continues to be performed in the calculation mode. With the device in the timekeeping mode, actuation of the setting switch, 8, establishes an operating condition such that the time can be set as required for correction. Numeral 16 shows a key which is used for the addition function in the calculation mode, and to establish a condition whereby the seconds can be corrected, with the device in the timekeeping mode. Similarly, key 17 is used for the subtraction function in the calculation mode, or for correction of minutes information, and key 19 is used for the multiplication function in the calculation mode and for correction of hours information in the timekeeping mode. Key 21 is used for the division function in the calculation mode, and for correcting the AM/PM indication in the timekeeping mode.

The ten keys shown collectively by the numeral 12 are used to input data when the device is in the calculation mode, and to input time correction information in the timekeeping mode, when the device has been set to the time correction condition.

The other keys indicated by numerals 7, 9 and 10 have functions which are well known in conventional calculator design, i.e. decimal point insertion, readout of results, and clearing, and will not be described further.

Figure 2:
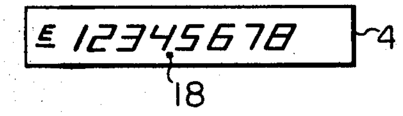
FIG. 2 illustrates the appearance of display 4 of FIG. 1 when the device is being used as a calculator.

FIG. 2 shows the display in the calculation mode, with numeral 18 indicating the decimal point.

Figure 3:
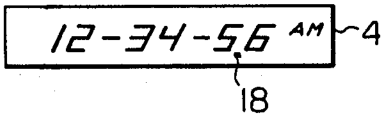
FIG. 3 illustrates the appearance of display of FIG. 1 when the device is being used as a timepiece and the tens of seconds have been selected for correction.
Figure 4:
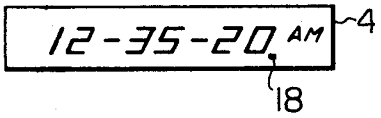
FIG. 4 illustrates the appearance of display 4 of FIG. 1 when the device is being used as a timepiece and the tens of seconds have just been corrected, with the units of seconds now being selected for correction.

In FIG. 3, which shows the appearance of the display immediately after the setting switch 8 and the seconds correction key 16 have been actuated with the device in the timekeeping mode. The decimal point indicator of the display appears just to the right of the tens of seconds, and thereby indicates that the tens of seconds can be corrected by depressing one of the ten keys 12. If the "2" key of the ten keys is depressed, then the tens of seconds are set to 2 and the units of seconds are set to zero. The display then appears as in FIG. 4. In FIG. 4, the decimal point is automatically moved to the right of the units of seconds digit on the display. This indicates that the units of seconds can now be corrected, if so desired, in the same way as for the tens of seconds. If this is done, then the decimal point indicator automatically moves back to the position just to the right of the tens of seconds digit, indicating that the tens of seconds can now be corrected again if required.

If, after the setting switch 8 has been actuated, the minutes setting key 17 is depressed, then the tens and units of minutes can be corrected, by the same process as described for seconds setting. In this case too, the decimal point indicator appears immediately to the right of the digit which can be corrected, and moves to the other digit when one digit has been corrected. The above is also true for setting of the hours units and tens, after the hours setting switch 19 has been depressed.

Figure 5:
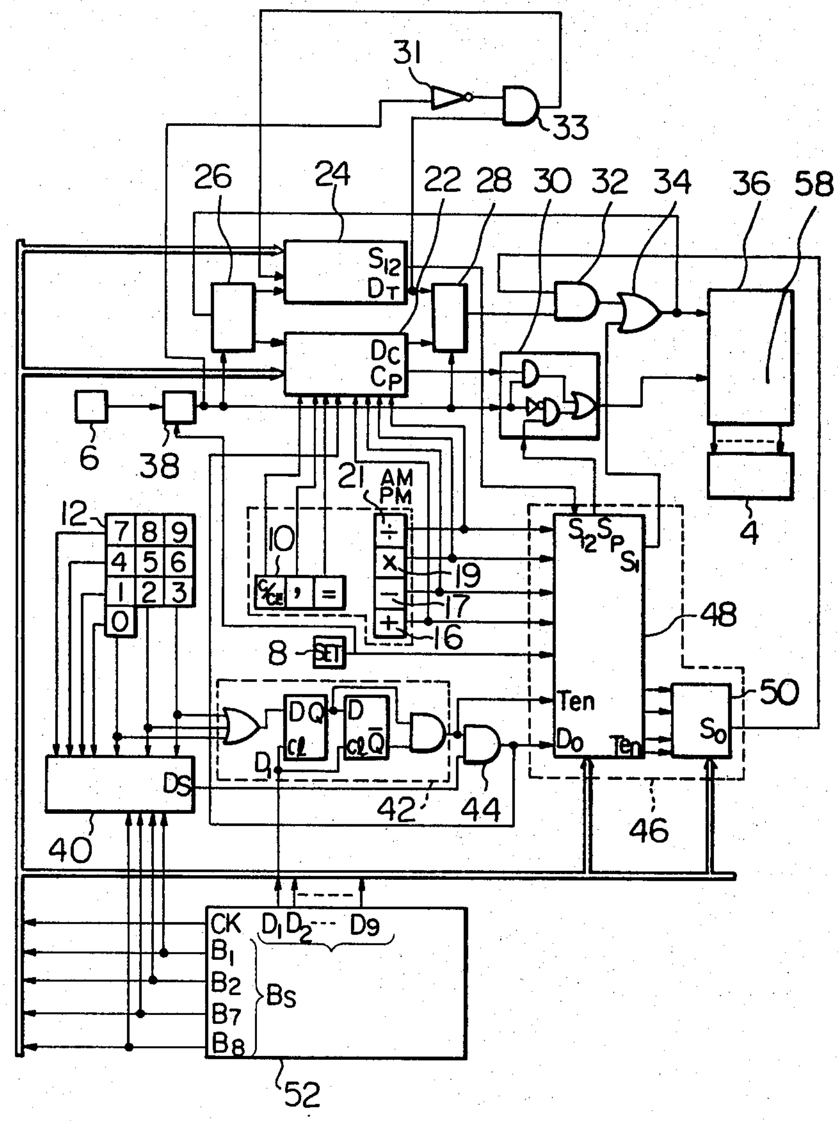
FIG. 5 is a block diagram illustrating the electronic components, switches and pushbuttons of the device.

Referring now to FIG. 5, a general block diagram of the preferred embodiment is shown therein. A timekeeping section 24 and a calculation section 22 generate timekeeping data signal Dt and calculation data signal Dc, respectively. Signal Dt or signal Dc is selected by an output selector gate 28 for input to a clear gate, 32, whose output is applied to a setting gate 34. The output of setting gate 34 is applied to an input selector gate 26, for input to either timekeeping section 24 or calculation section 22. Both input selector gate 26 and output selector gate 28 are controlled simultaneously by mode selector 38. The output logic level from mode selector 38 is controlled by actuation of mode switch 6 and setting switch 8. In the calculation mode, the time information flows in serial form from section 24 as signal Dt, through AND gate 33 which is controlled by the output from mode selector 38 through inverter 31.

When the timekeeping mode is selected, the time information flows, in serial form, from output Dt of timekeeping section 24 through gates 28, 32 and 34, and into the timekeeping section 24 through input selector gate 26. Each second, the units of seconds part of the time data is incremented by one. This is done by generating standard pulses once per second, by counting a clock signal Ck produced by a timing section 52. The output pulses from timing section 52, which control the timing of calculation operations as well as timekeeping, are illustrated in the waveform diagram of FIG. 6. Each digit of time information appearing on the display is coded as a series of four pulses, or bits, which correspond in timing to the bit pulses B1 to B8 in FIG. 6, and which circulate as described above. The bits corresponding to the units of seconds are applied to the input of clear gate 32 at the timing of the digit pulse D1, while the tens of seconds bits are applied at the timing of D2. Similarly, the units of minutes, tens of minutes, units of hours and tens of hours are applied to the input of clear gate 32 at the timing of digit pulses D3, D4, D5, D6, D7, and D8, respectively. Bits representing the AM/PM information are applied to gate 32 during digit pulse time D9. To clear any of the time information digits to zero, it is only necessary to apply a logic "0" input to gate 32 during the corresponding digit pulse timing. Similarly, to set in time information, the appropriate number of "1" logic level pulses with the appropriate bit pulse timings, are applied to an input of setting gate 34 during the digit pulse timing corresponding to the time information to be corrected.

Signals to perform such clearing and setting functions are generated by time correction section 46. Output signal So from block 50 is applied to an input of clear gate 32 immediately prior to time information being set in by means of signal Si from block 48.

Output Sp from block 48 controls the position at which the decimal point appears on the display, in the timekeeping mode, to indicate a digit which is to be corrected, as described previously. Selection of Sp from the time correction section or of decimal point indication signal Cp from the calculation section, is controlled by Sp selector gate 30, which in turn is controlled by the output of mode selector 38.

In both the timekeeping and calculation modes, the information to be displayed is applied to a display driver section, 58, from the outputs of setting gate 34 and Sp selector gate 30. Outputs from the display driver section drive the display, 4.

Figure 6:
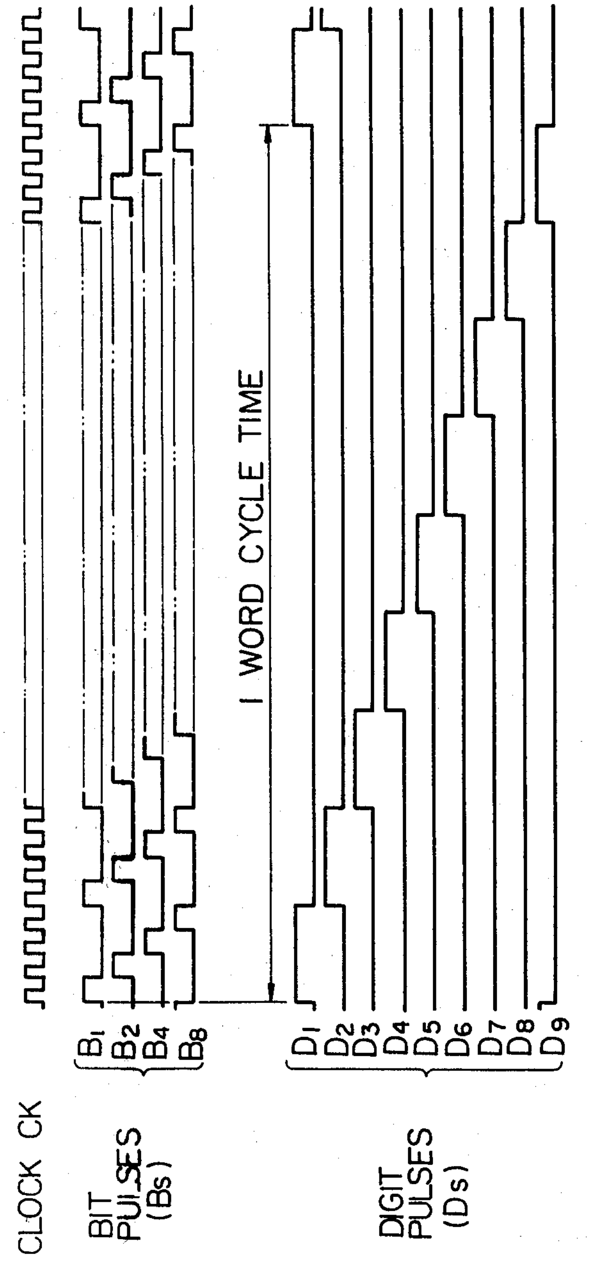
FIG. 6 is a waveform diagram of signals used for timing purposes in the circuitry of FIG. 5.

As can be seen from FIG. 6, nine digit pulses occur in one word cycle.

With the device in the timekeeping mode and with the setting switch having been actuated, depression of one of the ten keys 12 causes a ten keys detection section 42 to generate a signal called a Ten pulse, of duration one word cycle. The leading edge of a Ten pulse coincides with that of a digit pulse D1 produced by the timing section 52. The Ten pulse is input to time correction section 46, and also to an input of AND gate 44. A signal Ds output from an encoder 40 is thereby enabled to be input to timing correction section 46 during the one word cycle time of the Ten pulse. Signal Ds consists of 4 bits of data in serial form, coded to correspond with the numeric value of the ten key, synchronized with bit pulses B1 to B8, and repetitively generated from encoder 40 so long as the ten key is held depressed. Thus, each time a ten key is depressed during the time setting procedure, numeric data corresponding to the key depressed is gated through gate 44, and applied to time correction section 46 as signal Do, during one word cycle time.

A more detailed description will now be given of the time correction section 46, referring to FIG. 7.

With the device in the normal timekeeping condition, i.e. when setting switch 8 is not actuated, a "0" logic level input is applied to an inverter, 48*e*, resulting in a "1" level logic signal being applied from inverter 48*e* output to reset terminals of flip-flops 48*n*, 48*p*, 48*q*, and 48*b* and to hold AND gate 48*k* in the inhibited state by the output of inverter 48*j*. When the setting switch is actuated, the output of inverter 48*e* goes to the "0" logic level, releasing the reset input to flip-flops 48*n*, 48*p*, 48*q*, and 48*b*, and the inhibit input to gate 48*k*. If, in this state, the seconds setting key 16 is depressed, then a "1" level logic signal will be applied to the set terminal of flip-flop 48*n*, while flip-flops 48*p* and 48*q* will be held in the reset state by outputs from OR gates 48*h* and 48*i*, respectively. The output Q of flip-flop 48*n* will therefore go to the "1" logic level, and will remain at that level after the seconds setting key 16 is released. The "1" level output from 48*n* is applied to AND gates 48*s* and 48*r*.

At this time, the $\overline{Q}$ output of data-type flip-flop 48*b* is at the "1" logic level, as a result of the "1" level input which was previously being applied to its reset terminal R when the setting switch 8 was not being actuated. Thus, the output of gate 48*r* goes to the "1" logic level, causing the output of AND gate 48*t* to go to the "1" level during the timing of digit pulse D2, i.e. during the timing that the tens of seconds time information signal is applied to setting gate 34 shown in FIG. 5.

At the same time, the "1" level output from AND gate 48*r* is also input to AND gate 50*d* in circuit block 50. "1" level inputs are applied to a second input of AND gate 50*d* at the timing of digit pulses D1 and D2 from OR gate 50*k*. The Ten pulse is applied to a third input of AND gate 50*d*. The output from AND gate 50*d* is applied through OR gate 50*h* and NOR gate 50*g*, as signal So, to clear gate 32 shown in FIG. 5. Since in this case signal So goes to the "0" logic level at digit timings D1 and D2, i.e. when the tens of seconds and units of seconds of time information are being applied to clear gate 32, the previous tens of seconds and units of seconds data is reset to zero.

During this digit timing D2, however, data signal Do, corresponding to the numeric value of the new tens of seconds information which is to be set in, is passed through AND gate 48*x* as a result of the "1" level state of the output from AND gate 48*t*. This data is then applied through OR gate 48*z*, as signal S1, to an input of setting gate 34 shown in FIG. 5. Thus, the new tens of seconds data is inserted during timing D2, through setting gate 34, to replace the previous information which had just been deleted, also during timing D2, as the time data passed through clear gate 32. This new tens of seconds will then appear on the display as a digit corresponding to the ten key which was depressed to perform time setting. Also, since the units of seconds data was reset to zero during digit pulse timing D1, but no new data for units of seconds was input to setting gate 34 at this timing, the units of seconds digit on the display 4 will become zero. Thereafter, the units of seconds data will be incremented once per second by the timekeeping section.

When the tens of seconds are selected for correction, as described above, then the "1" level output from AND gate 48*t* during digit pulse timing D2 is applied through OR gate 48*y* to the display driver section 58, as signal Sp. As a result, the decimal point appears on the display just to the right of the tens of seconds digit.

As stated previously, the Ten pulse has a duration of one word cycle, and begins when one of the ten keys is depressed for time setting. At the end of the word cycle time in which the tens of seconds are set, the Ten pulse goes to the "0" logic level, and the resulting falling edge, inverted by inverter 48*a*, causes flip-flop 48*b* outputs Q and $\overline{Q}$ to change state. AND gate 48*r* is thereby inhibited and AND gate 48*s* is enabled, so that during the next D1 digit pulse time a "1" logic level output is produced by AND gate 48*u*. Applied to the display drive section 58 through OR gate 48*y*, as signal Sp, this causes the decimal point on the display 4 to appear just to the right of the units of seconds digit, indicating that the units of seconds can now be set by means of the ten keys if desired.

If, now, one of the ten keys is depressed to set in a new value of units of seconds, a Ten signal will be produced and input to AND gate 50*c* together with the "1" level output from gate 48*u*. The output of AND gate 50*c* is inverted to "0" logic level by NOR gate 50*g*, and applied to clear gate 32 to delete the previous units of seconds time information. Also during digit pulse timing D1, the new units of seconds time data is passed through gate 48*w* by the action of the "1" level input applied to 48*w* from gate 48*u*. This new time data passes through OR gate 48*z* and is applied to setting gate 34, so that the new units of time data is set in.

As in the case of tens of seconds time setting, the falling edge of the Ten pulse causes flip-flop 48*b* to change output states. As a result, the tens of seconds can again now be reset, and this fact is indicated by the decimal point on the display.

Figure 7:
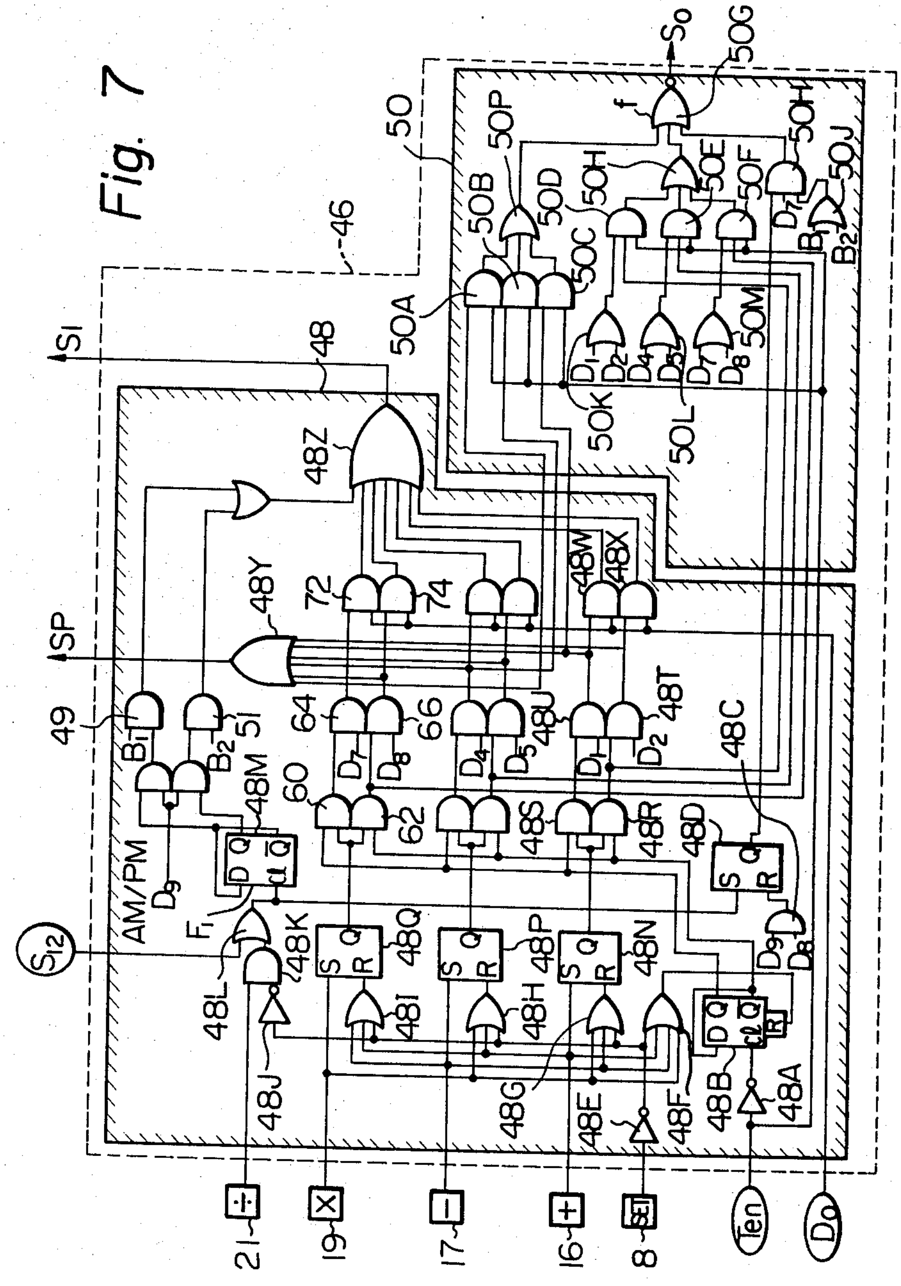
FIG. 7 shows the composition of block 46 of FIG. 5, which includes blocks 48 and 50.

The operation of the circuit of FIG. 7 in the case of setting the tens and units of minutes, or the tens and units of hours, is identical to that described above for setting the seconds time information. In the case of minutes setting, key 17 is depressed after actuating setting switch 8, and in the case of hours setting, key 19 must be depressed.

A signal S12, generated once every 12 hours, is applied to a data-type flip-flop 48*m* through OR gate 481, causing flip-flop 48 to change state. Bit pulses B1 or B2 are thereby gated through AND gates 49 and 51 to cause the appropriate AM or PM symbol to be displayed. Correction of the AM/PM information can be performed by a signal applied to OR gate 481 from key 21, through AND gate 48*k*.

Figure 8:
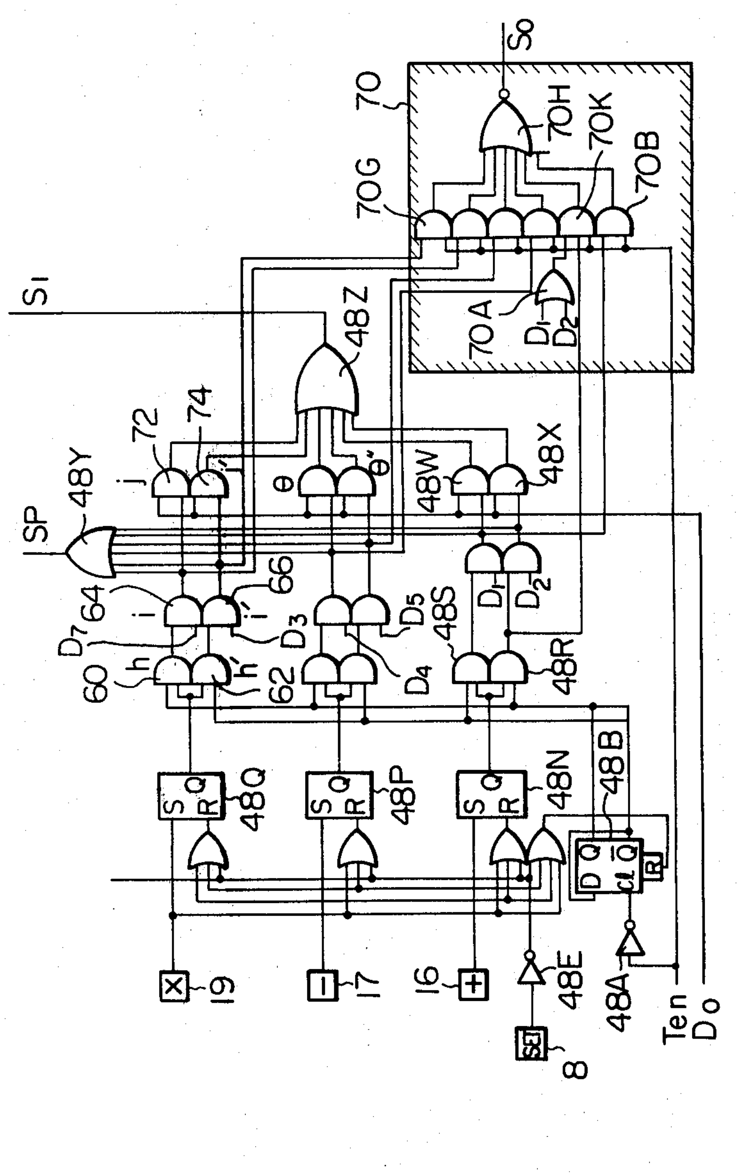
FIG. 8 shows a modification of part of block 46 in FIG. 5, whereby an alternative method of setting the units and tens of hours and minutes is adopted.

A modification of time correction section 46 is shown in FIG. 8. With this arrangement, correction of the units and tens of minutes and of the units and tens of hours, is performed independently. Thus, when for example tens of hours are corrected, the units of hours are not automatically reset to zero, as in the case of the circuit of FIG. 8, but remain unchanged.

When tens of hours correction setting is selected by actuating setting key 8 and depressing key 19, a "1" level output is generated from AND gate 66 during each following digit pulse timing D8. This output is applied to an input of AND gate 70*g*. If a ten key is now depressed to perform tens of hours correction, signal Ten is generated and causes a "1" level output to be produced by gate 70*g*. The previous tens of hours time data is thereby reset to zero and new time data set in for correction, in the same way as described above in the case of tens of seconds correction. However no So signal is produced at digit timing D7 to clear the units of hours time data. The previous data remains unchanged until a ten key is depressed to correct the units of hours.

The above description also applies to correction of units and tens of minutes. Time correction may be made by firstly performing correction of the units of minutes as seen from FIG. 8. In the case of seconds correction, however, the operation is identical to that of the circuit in FIG. 7, i.e. when the tens of seconds are corrected, a "1" logic level signal is produced from AND gate 70*k*, at digit pulse timing D1, which causes automatic resetting of the units of seconds data to zero through signal So.

What is claimed is:

1. In a portable electronic device having time-keeping circuit means for providing at least units of seconds and tens of seconds of time information, and display means for displaying said time information in digital form, the improvement comprising: a plurality of first external control members for inputting numeric data signals;

a control circuit for selecting at least said tens of seconds of time information for correction;

a second external control member for inputting control signals to actuate said control circuit;

first gate means for applying said numeric data signals to said timekeeping circuit means to effect correction of at least said tens of seconds of time information;

second gate means for automatically resetting said units of seconds of time information to zero in response to correction of said tens of seconds of time information;

said units of seconds of time information being incremented once per second by said timekeeping circuit means, said incrementing commencing immediately subsequent to said automatic resetting to zero of said units of seconds by said second gate means; and circuit means for automatically shifting to selection of the units of seconds of time information for correction, immediately subsequent to correction of said tens of seconds of time information.

2. The improvement according to claim 1, further comprising first sensing means for sensing that said tens of seconds of time information are selected for correction and first actuation means responsive to said first sensing means for actuating said display to indicate that said tens of seconds are selected for correction.

3. The improvement according to claim 1, further comprising second sensing means for sensing that correction of said tens of seconds of time information has been performed, second actuation means responsive to said second sensing means for actuating said display means to indicate that said units of seconds of time information are selected for correction, and third actuation means responsive to said second sensing means for actuating said control circuit to select said units of seconds of time information for correction.

4. A combined electronic timepiece and calculator, comprising;

timing signal generation means for generating a standard frequency clock signal and a plurality of timing signals;

timekeeping circuit means responsive to said standard frequency clock signal for computing at least the units and tens of seconds, units and tens of minutes, and units and tens of hours of current time information;

a plurality of numeric keys for generating numeric data signals when actuated;

encoder circuit means responsive to said timing signals from said timing signal generator for encoding said numeric data signals in time serial form to produce a serial numeric data signal;

calculation circuit means coupled to receive said serial numeric data signal;

externally actuatable mode selection means for generating first and second mode selection signals;

an output selector gate coupled to receive a time information signal from said timekeeping circuit means and a calculation information signal from said calculation circuit means, and responsive to said first mode selection signal and said second mode selection signal for selectively passing said calculation information signal and said time information signal respectively;

a clear gate coupled to receive signals passed by said output selector gate;

a setting gate coupled to receive the output of said clear gate;

an input selector gate responsive to said first control signal for passing the output of said setting gate to an input of said calculation circuit, and responsive to said second control signal for passing the output of said setting gate to an input of said timekeeping circuit;

display driver circuit means coupled to the output of said setting gate, for producing display drive signals;

an electro-optical display device responsive to said display drive signals for displaying calculation results and time information in digital form;

a plurality of function keys for producing control signals to selectively designate said hours, minutes and seconds of time information for correction;

circuit means for producing a ten key actuation signal each time one of said numeric keys is actuated;

circuit means responsive to said time information correction designation signals and to said ten key actuation signal for producing a first gate control signal prior to a first actuation of a numeric key subsequent to actuation of a function key, and for producing a second gate control signal upon the first actuation of a numeric key subsequent to said actuation of a function key;

circuit means responsive to said timing signals, said first gate control signal, said serial numeric data signal and a control signal designating the seconds of time information for correction, for applying said numeric data signal to said setting gate to set the tens of seconds of time information computed by said timekeeping circuit to a corrected value, and for applying a clear signal to said clear gate whereby the units for seconds of time information are reset to zero and thereupon commence to be incremented once per second by said timekeeping circuit, and thereafter responsive to said second gate control signal, said serial numeric data signal, said timing signals, and said control signal designating the seconds of time for correction, for applying said serial numeric data signal to said setting gate, thereby setting the units of seconds of time information computed by said time-keeping circuit to a corrected value.

* * * * *